United States Patent
Bröcker et al.

(10) Patent No.: US 12,012,926 B2
(45) Date of Patent: Jun. 18, 2024

(54) PLANETARY CARRIER ARRANGEMENT, PLANETARY GEAR, DRIVE TRAIN, WIND TURBINE AND COMPUTER PROGRAM PRODUCT

(71) Applicant: Flender GmbH, Bocholt (DE)

(72) Inventors: Sarah Bröcker, Bocholt (DE); Alfons Böing, Hamminkeln (DE); Markus Degeling, Rhede (DE); Christian König, Bochum (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/277,192

(22) PCT Filed: Feb. 1, 2022

(86) PCT No.: PCT/EP2022/052272
§ 371 (c)(1),
(2) Date: Aug. 14, 2023

(87) PCT Pub. No.: WO2022/171482
PCT Pub. Date: Aug. 18, 2022

(65) Prior Publication Data
US 2024/0117790 A1    Apr. 11, 2024

(30) Foreign Application Priority Data
Feb. 15, 2021   (EP) .................... 21157156

(51) Int. Cl.
*F16H 57/04*    (2010.01)
*F03D 15/10*    (2016.01)
(Continued)

(52) U.S. Cl.
CPC ............ *F03D 15/101* (2023.08); *F16H 1/28* (2013.01); *F16H 57/043* (2013.01);
(Continued)

(58) Field of Classification Search
CPC ........ F03D 15/101; F16H 1/28; F16H 57/043; F16H 57/0479; F16H 57/0486;
(Continued)

(56) References Cited

U.S. PATENT DOCUMENTS 8,636,615 B2    1/2014   Suzuki et al.
9,803,743 B2 *  10/2017  Brault ................... F16H 57/042
2017/0286572 A1 10/2017  Hershey et al.

FOREIGN PATENT DOCUMENTS

CN    201277153 Y    7/2009
DE    102 60 132 A1   7/2004
(Continued)

OTHER PUBLICATIONS

International Search Report dated Apr. 29, 2022 by the European Patent Office in International Application PCT/EP2022/052272.

*Primary Examiner* — Justin Holmes
(74) *Attorney, Agent, or Firm* — Henry M. Feiereisen LLC

(57) ABSTRACT

A planetary carrier arrangement Includes a planetary carrier, and a lubricant dispensing unit designed to dispense lubricant into the planetary carrier. The lubricant dispensing unit includes an axially elastically movable thrust ring designed to compensate an axial offset of the planetary carrier. The thrust ring has a side in facing relationship to the planetary carrier, with the side designed to include a lubricant pocket thereon.

16 Claims, 5 Drawing Sheets

(51) Int. Cl.
*F16H 1/28* (2006.01)
*F16H 57/08* (2006.01)

(52) U.S. Cl.
CPC ..... *F16H 57/0479* (2013.01); *F16H 57/0486* (2013.01); *F16H 57/082* (2013.01); *F05B 2260/40311* (2013.01); *F05B 2260/84* (2013.01); *F16H 57/0482* (2013.01)

(58) Field of Classification Search
CPC ............... F16H 57/082; F16H 57/0482; F05B 2260/40311; F05B 2260/84
See application file for complete search history.

(56) References Cited

FOREIGN PATENT DOCUMENTS

| | | | | |
|---|---|---|---|---|
| DE | 102012210696 A1 | * | 1/2014 | ......... F16H 57/0427 |
| DE | 102015211470 A1 | * | 12/2016 | |
| EP | 1 488 139 B1 | | 8/2006 | |
| EP | 3 056 763 A1 | | 8/2016 | |
| EP | 3 042105 B1 | | 12/2017 | |
| EP | 3 333 459 A1 | | 6/2018 | |
| KR | 101506089 B1 | * | 3/2015 | |
| WO | WO 2020/001942 A1 | | 1/2020 | |

\* cited by examiner

PLANETARY CARRIER ARRANGEMENT, PLANETARY GEAR, DRIVE TRAIN, WIND TURBINE AND COMPUTER PROGRAM PRODUCT

CROSS-REFERENCES TO RELATED APPLICATIONS

This application is the U.S. National Stage of International Application No. PCT/EP2020/052272, filed Feb. 1, 2022, which designated the United States and has been published as International Publication No. WO 2022/171482 A1 and which claims the priority of European Patent Application, Serial No. 21157156.7, filed Feb. 15, 2021, pursuant to 35 U.S.C. 119(a)-(d).

BACKGROUND OF THE INVENTION

The invention relates to a planetary carrier arrangement which can be used in a planetary transmission, and to a planetary transmission of this type. The invention likewise relates to a drive train which has a planetary transmission of this type. The invention likewise relates to a wind power plant which has a drive train of this type, and to a computer program product, by way of which the operating behavior of a planetary carrier arrangement according to the invention can be simulated.

Patent specification U.S. Pat. No. 8,636,615 B2 discloses a planetary transmission for a wind power plant, which planetary transmission has an input-side planetary stage with a planetary carrier. The planetary carrier is mounted rotatably on both sides in a planetary carrier bearing, and is provided in a generator-side hub with a lubricant attachment. The lubricant attachment is positioned directly adjacently with respect to the generator-side planetary carrier bearing. Seal rings which interact with a lubricant dispensing means are arranged on an outer side on the lubricant attachment.

Document EP 1 488 139 B1 has disclosed a planetary carrier in a transmission of a wind power plant, which planetary carrier is supplied with oil via a housing wall. In the region of a side wall of the planetary carrier, oil is transferred via a ring which is attached there with a U-profile from the housing wall into the planetary carrier.

Document WO 2020/001942 A1 discloses a planetary transmission which is suitable for a wind power plant and has three planetary stages. Here, the planetary stages can have five or more planetary gears (wheels).

EP 3 056 763 A1 has disclosed a planetary carrier arrangement with a lubricant dispensing unit for dispensing lubricant into a planetary carrier, the lubricant dispensing unit having an elastomeric thrust ring.

Planetary transmissions are used in a multiplicity of applications, in which Increasing rated power outputs and rated torques are to be transmitted. To this end, lubricant supply means are required which function reliably even under operating conditions with high prevailing torques. This applies, in particular, to the lubricant supply of planetary carriers. At the same time, there is the desire for maintenance-friendly planetary transmissions which can be produced cost-efficiently. The invention is based on the object of providing a planetary carrier arrangement which provides an improvement in at least one of the above-described points.

SUMMARY OF THE INVENTION

The object is achieved by way of a planetary carrier arrangement as set forth hereinafter. Preferred refinements (embodiments) are specified in the subclaims and the following description, which can each represent one aspect of the Invention individually or in combination. If a feature is shown in combination with another feature, this serves only for simplified illustration of the Invention and is not in any way to mean that this feature cannot also be a development or implementation of the invention without the other feature.

The planetary carrier arrangement comprises a lubricant dispensing unit for dispensing lubricant into a planetary carrier, the lubricant dispensing unit having an axially elastically movable thrust ring for compensation of an axial offset of the planetary carrier, at least one lubricant pocket being configured on a side, facing the planetary carrier, of the axially elastically movable thrust ring.

The planetary carrier can be arranged rotatably in a housing. The lubricant dispensing unit is configured to dispense a lubricant, for example an oil, to the planetary carrier, and can be connected to the housing to this end. As an alternative, the lubricant dispensing unit can be connected to the planetary carrier. The lubricant can be forwarded in the planetary carrier for the lubricant supply of further components which are connected to or interact with the planetary carrier. Components of this type are also understood to be consumers in a lubricant system. The lubricant unit comprises the axially elastically movable thrust ring which is also only called a thrust ring for short in the following text. An axially elastic movability includes that the thrust ring tends to return into a starting position by way of a restoring force which results from a movement of the thrust ring along an axial direction. As a result, the axially elastically movable thrust ring is configured for compensation of an axial offset of the planetary carrier. The axial offset of the planetary carrier can be brought about by way of operating loads and/or tolerance chains which act. As a result of the compensation of the axial offset of the planetary carrier, a loss of lubricant between the axially elastically movable thrust ring and the planetary carrier Is minimized or prevented. The planetary carrier arrangement according to the invention is suitable for use in planetary transmissions which permit axial offsets of the planetary carrier and at the same time require minimum losses of lubricant. Moreover, the planetary carrier arrangement according to the invention also permits a radial offset and/or tilting of the planetary carrier. As a result of the axially elastically movable thrust ring, increased tolerances on the planetary carrier and the lubricant dispensing unit are also possible in the axial direction during production, without impairing the sealing action between them. This in turn permits cost-efficient production of the planetary carrier arrangement according to the invention.

Furthermore, at least one lubricant pocket is configured on the axially elastically movable thrust ring on a side which faces the planetary carrier. The at least one lubricant pocket can be configured in the end region of a lubricant channel. As a result, a reliable and continuous supply of lubricant to the planetary carrier can be ensured in accordance with the principle of a lubricating pocket in a slide-bearing disc. The axially elastically movable thrust ring provides sufficient installation space on its end face in order to configure a plurality of lubricant pockets. Lubricant pockets can be produced by way of simple machining, for example by way of milling. The advantages of the claimed planetary carrier arrangement can thus be achieved to an Increased extent. As an alternative or in addition, lubricant pockets of this type can also be configured on the sealing ring and/or on the planetary carrier. A plurality of lubricant pockets can be connected to one another both on the thrust ring and on the sealing ring or planetary carrier, that is to say can merge into one another. The lubricant pockets are provided, in particular, in a common radius region. The plurality of lubricant pockets are spaced apart from one another in the circumferential direction; that is to say, a material region of the thrust ring or the sealing ring which is not machined by means of material ablation in order to configure the lubricant pockets remains between two successive lubricant pockets in the circumferential direction. In contrast to a circumferential closed lubricating groove, a mass flow can be specified in a defined manner from a lubricant dispensing opening to an opening which lies substantially opposite it, and a bypass flow to an opening which is offset in the circumferential direction can be avoided. This makes it easier to connect different consumers via the lubricant pocket to different lubricant dispensing openings, and to ensure a sufficient supply with lubricant.

In one embodiment of the claimed planetary carrier arrangement, the lubricant dispensing unit comprises a stator which is connected fixedly to the housing, and through which the lubricant is conducted. The stator is understood to mean a stationary and non-corotating part of the lubricant dispensing unit which is, in particular. In multiple pieces, it also being possible for the lubricant dispensing unit to have a corotating part which is called a rotor. At least one spring element which gives the thrust ring its axially elastic movability can be arranged between the axially elastically movable thrust ring and the stator. Here, any component which provides a technically utilizable elasticity and restoring force can serve as spring element. As an alternative or in addition, the spring element can also be a hydraulic apparatus which is filled with lubricant and utilizes an existing lubricant pressure for suspension and/or damping. Spring elements provide a sufficient restoring force in addition to an increased service life, with the result that reliable operation is ensured in the long term. Spring elements are likewise simply available in a multiplicity of sizes and spring rates, and thus permit a precise adjustability for the restoring force. In a further embodiment, a plurality of spring elements can also be arranged between the axially elastically movable thrust ring and the stator. As a result, the claimed planetary carrier arrangement can be scaled to different sizes, in which increased restoring forces on the axially elastically movable thrust ring are required. Furthermore, the spring elements can be arranged spaced apart along a circumferential direction of the stator. In particular spaced apart uniformly, and can thus ensure continuous bearing or resting of the axially elastic thrust ring against the planetary carrier. In particular, tilting of the thrust ring can be compensated for by way of spring elements.

Furthermore, a sealing ring which is configured to receive lubricant from the axially elastically movable thrust ring can be arranged on the planetary carrier. To this end, the sealing ring can be arranged between the planetary carrier and the axially elastically movable thrust ring. Via the sealing ring, a contact region can be established between the planetary carrier and the axially elastically movable thrust ring, which contact region permits a radial offset and/or tilting between the latter. The sealing ring can be configured in a simple way to ensure reliable transport of lubricant into the planetary carrier even in the case of increased radial offsets. The sealing ring can be produced from a material which has favorable wear properties in contact with the axially elastically movable thrust ring, for example made from a sliding material, in particular a copper alloy, or a plastic. The material selection for the axially elastically movable thrust ring, the sealing ring, the stator and/or the planetary carrier is as far as possible free as a result. As a consequence, particularly suitable materials can be selected for these components, which provides an increased service life and increased reliability for the claimed planetary carrier arrangement. Furthermore, only surfaces on the axially elastically movable thrust ring and on the sealing ring require precise machining, with the result that they provide a sufficient sealing action and/or sliding action. The axially elastically movable thrust ring and the sealing ring are relatively small and easy components which are considerably simpler to handle in comparison with the housing or the planetary carrier. The manufacturing complexity for the claimed planetary carrier arrangement is reduced as a result. The sealing ring can be connected fixedly to the planetary carrier for conjoint rotation, or can lie loosely on the planetary carrier.

In a further embodiment of the claimed planetary carrier arrangement, the lubricant dispensing unit can comprise at least one fastening means, by way of which the axially elastic movable thrust ring is secured against rotation with respect to the stator. The fastening means can be configured, for example, as a screw or bolt, by way of which a rotation of the axially elastically movable thrust ring is blocked. The at least one fastening means can be positioned in the circumferential direction adjacently with respect to an axial lubricant channel in the axially movable thrust ring or between lubricant channels of this type. In an analogous manner, the at least one fastening means can also be arranged in the circumferential direction adjacently with respect to a spring element or between spring elements of this type. The claimed planetary carrier arrangement allows a rotation of the axially elastically movable thrust ring to be minimized or to be prevented by way of the use of a plurality of fastening means, even counter to increased forces. As an alternative, the fastening means can be configured to permit a rotation of the axially elastic movable thrust ring and to limit its movability only in the axial direction.

Moreover, at least one sealing element can be arranged between a radial outer face of the axially elastically movable thrust ring and the stator. The sealing element can be configured, for example, as an elastomer ring, in particular as an O-ring. A loss of lubricant between the stator and the axially elastically movable thrust ring is minimized or prevented by way of the sealing element. As a result of its positioning on the radial outer face, the sealing element is suitable to reliably bring about a sealing action even in the case of a movement of the thrust ring along the axial direction. In a further embodiment of the claimed planetary carrier arrangement, at least two sealing elements which are spaced apart axially can also be arranged on the radial outer face of the axially elastically movable thrust ring. A dispensing opening can be configured between the at least two sealing elements, through which dispensing opening lubricant can be conveyed from the stator into the axially elastically movable thrust ring. Analogously, the at least one sealing element can also be arranged on a radial inner face of a stator of the lubricant dispensing unit. As a result, a substantially identically acting alternative is available. Combinations thereof are also possible. Furthermore, O-ring(s) also permit a radial offset of the planetary carrier and/or tilting of the planetary carrier.

Furthermore, the planetary carrier of the claimed planetary carrier arrangement can be received in the housing in a bearing-free manner at least on one of its sides. The claimed planetary carrier arrangement permits compensation of axial offsets of the planetary carrier by way of the axially elastic movability of the thrust ring. The contact between the axially elastically movable thrust ring and the planetary carrier permits compensation of radial offsets between them. Accordingly, bearings, for example roller bearings or plain (slide) bearings, which fix the planetary carrier in the housing on the side which faces the lubricant dispensing unit can be dispensed with. This makes it possible for an increased number of planetary gears, in particular five or more, to be received in the planetary carrier, which planetary gears are mounted via plain bearings and continuously require a sufficient lubricant supply. In planetary carriers of this type, a load distribution which is automatically adjusted between the planetary gears can be implemented. This in turn permits an improved material utilization in the claimed planetary carrier arrangement. The planetary carrier of the claimed planetary carrier arrangement can preferably also be received in the housing in a bearing-free manner on a side which faces away from the lubricant dispensing unit. As a result, the outlined advantages are achieved to an increased extent, in particular an increased cost efficiency and maintainability.

In a further embodiment of the claimed planetary carrier arrangement, the axially elastically movable thrust ring can be arranged so as to lie opposite a hub of the planetary carrier. In particular, the axially elastically movable thrust ring can be supported axially on an end face of the hub directly or via a sealing ring. As a result, the installation situation of the planetary carrier reliably results in the axially elastically movable thrust ring bearing or resting against the planetary carrier, as a result of which a sealing action is brought about continuously during operation. The hub of the planetary carrier can represent the region of the planetary carrier with the smallest diameter. The axially elastic movable thrust ring can thus be configured with a decreased diameter. As a result, the reliability of the sealing action between the axially elastically movable thrust ring and the planetary carrier or the sealing ring is also increased. The hub, opposite which the elastically movable thrust ring is arranged, can be a hub on a generator side, that is to say an output side, of the planetary carrier. This allows the length of external oil lines on the planetary transmission to be kept small. In the case of a planetary carrier which is received in the housing in a bearing-free manner at least on the side which faces the lubricant dispensing unit, the hub can be of shortened configuration in the axial direction on this side. As a result, additional weight saving and installation space saving in the axial direction are achieved.

In the claimed planetary carrier arrangement, the axially elastically movable thrust ring can likewise have a clear interior diameter of at least 150 mm. This also results in a corresponding clear interior diameter of the planetary carrier in the region of the axially elastically movable thrust ring, in particular on its hub on the side which faces the lubricant dispensing unit, of at least 130 mm. On account of a clear interior diameter of this type, the planetary carrier is suitable for receiving sun gears and/or sun shafts with an increased external diameter. This in turn makes the use of an increased number of planetary gears in the planetary carrier possible. The more planetary gears are arranged in the planetary carrier, the higher is their requirement for lubricant and the more important is a reliable supply of lubricant. Overall, the claimed planetary carrier arrangement permits the configuration of particularly advantageous planetary stages in planetary transmissions.

Moreover, in the claimed planetary carrier arrangement, the spring element can be configured as a helical spring, a cup spring, an annular spring, a volute spring or an elastomer body. Helical springs are available in a simple way in a broad spectrum of sizes and spring rates. Cup springs can be combined precisely by way of suitable stacking to form cup spring assemblies with almost any desired spring properties. In addition, cup springs are compact. Annular springs can be used on account of their high spring rate in the claimed planetary carrier arrangement, even in compact embodiments. This applies analogously to a volute spring. Elastomer bodies provide a high degree of economic efficiency, with the result that they can be readily designed as a wear part in the claimed planetary carrier arrangement. Furthermore, the elastomer body can be produced by way of additive manufacturing, for example 3D printing. As a result, there is a high degree of adaptability. If a plurality of spring elements are used in the claimed planetary carrier arrangement, combinations of a plurality of embodiments of spring elements can also be combined.

The object on which the Invention is based is also achieved by way of a planetary transmission which has at least one planetary stage. The planetary stage has at least one planetary carrier arrangement which is arranged in a housing of the planetary transmission. According to the invention, the planetary carrier arrangement is configured in accordance with one of the embodiments outlined above. The technical advantages of the planetary carrier arrangement are thus transferred to a planetary transmission.

In one embodiment of the claimed planetary transmission, the planetary transmission comprises at least three planetary stages. To this end, the three planetary stages can be arranged in series connected behind one another. Planetary stages of this type are described in greater detail in document WO 2020/001942 A1. The disclosure of WO 2020/001942 A1 Is incorporated by reference into the present application.

Furthermore, a planetary carrier arrangement can be arranged in the claimed planetary transmission, in which planetary carrier arrangement at least three planetary gears are arranged. In particular, five or more planetary gears can also be arranged in the planetary carrier arrangement. The higher the number of planetary gears in a planetary stage, that is to say a planetary carrier, the more challenging is their reliable and homogeneous supply with lubricant. The planetary carrier arrangement according to the Invention provides a particularly suitable possibility for this purpose. In particular, seven, eight or nine planetary gears can also be arranged in the planetary carrier. As a result, a more homogeneous load distribution to a plurality of power branches can be achieved, which in turn makes the construction of more powerful and at the same time more compact planetary transmissions possible.

The abovementioned object is likewise achieved by way of a drive train according to the invention. The drive train is configured for use in a wind power plant, and comprises a transmission. The transmission can be connected in a torque-transmitting manner to a rotor shaft, by way of which a rotational movement of a multiple blade rotor is transmitted. The drive train also has a generator which is connected in a torque-transmitting manner to the transmission. According to the invention, the transmission is configured as a planetary transmission in accordance with one of the above-described embodiments. The technical advantages of the Invention outlined above are transferred as a result to an entire drive train which overall provides an increased operational performance, in particular electricity generation capacity, and at the same time has an increased reliability and service life. As a result, the drive train according to the invention is suitable, for example, for use in offshore wind power plants. Furthermore, the transmission and the generator can be received in a common housing, and can thus form a geared generator. Arrangements of this type are also called hybrid drives.

The object described at the outset is likewise achieved by way of a wind power plant according to the Invention. The wind power plant comprises a nacelle, to which a multiple blade rotor is attached rotatably which is connected in a torque-transmitting manner to a drive train. According to the invention, the drive train is configured in accordance with one of the above-described embodiments.

The object is likewise achieved by way of a computer program product according to the invention which is configured to simulate an operating behavior of a planetary carrier arrangement. To this end, the computer program product can comprise a physics model, in which the planetary carrier arrangement is modeled at least partially. The computer program product can also have a data interface, via which operating conditions can be stipulated, for example a rotational speed, a movement of a planetary carrier, prevailing forces, prevailing offsets and/or tilts, a lubricant feed throughput, a specification of a lubricant or its thermal, rheological or comparable properties. It can also be possible for material properties of components such as, for example, the modulus of elasticity, rigidity or surface condition to be stipulated by the data interface. Measured data from sensors can also be input into the physics model via the data interface. Simulation of the operating behavior can include determining of a loss of lubricant in the planetary carrier arrangement which results from a prevailing operating situation. Furthermore, the computer program product can have a data interface for outputting simulation results to a user and/or other simulation-related computer program products. The computer program product can be configured as what is known as a digital twin, by way of which the operating behavior of the planetary carrier arrangement can be modeled. Digital twins are described in greater detail, inter alia, in document US 2017/286572 A1. The disclosure of US 2017/286572 A1 is incorporated by reference into the present application. The computer program product can also be of monolithic configuration, that is to say can be run completely on a hardware platform. As an alternative, the computer program product can be of modular configuration and can comprise a plurality of part programs which can be run on separate hardware platforms and interact via a communicative data connection. A communicative data connection of this type can be a network connection or an Internet connection. In particular, the computer program product can be configured such that it can be run on a computer cloud. Furthermore, a planetary carrier arrangement can be tested and/or optimized by simulation by way of the computer program product according to the Invention. Furthermore, measured data from sensors on a planetary carrier arrangement and/or the associated planetary transmission can be checked for plausibility by means of the computer program product. As a result, for example, a defective sensor in the planetary carrier arrangement and/or the corresponding planetary transmission can be detected. As an alternative or in addition, the computer program product can also be used to detect a defective component in the planetary carrier arrangement and/or the planetary transmission. In order to detect the defective sensor and/or the defective component, the computer program product can also have what is known as artificial intelligence, for example a self-learning algorithm.

In particular, the computer program product has a data agglomerate with data packets which are combined in a common data file or are distributed over different data files for modeling the three-dimensional design and/or the interactions of all the constituent parts which are provided in the planetary carrier arrangement, the data packets being prepared during processing of the computer program product by way of a data processing device to carry out a simulation of the method of operation of the planetary carrier arrangement. This makes a computer-based simulation possible, in order to study the method of operation of the planetary carrier arrangement, to identify problems in the specific application, and to find Improvements.

BRIEF DESCRIPTION OF THE DRAWING

The invention will be explained in greater detail in the following text in figures on the basis of individual embodiments. The figures are to be interpreted in mutual combination in such a way that Identical designations in different figures have the same technical meaning. The features of the individual embodiments can also be combined among one another. Furthermore, the embodiments which are shown in the figures can be combined with the features outlined above. In the figures, in detail.

DETAILED DESCRIPTION OF PREFERRED EMBODIMENTS

Figure 1:
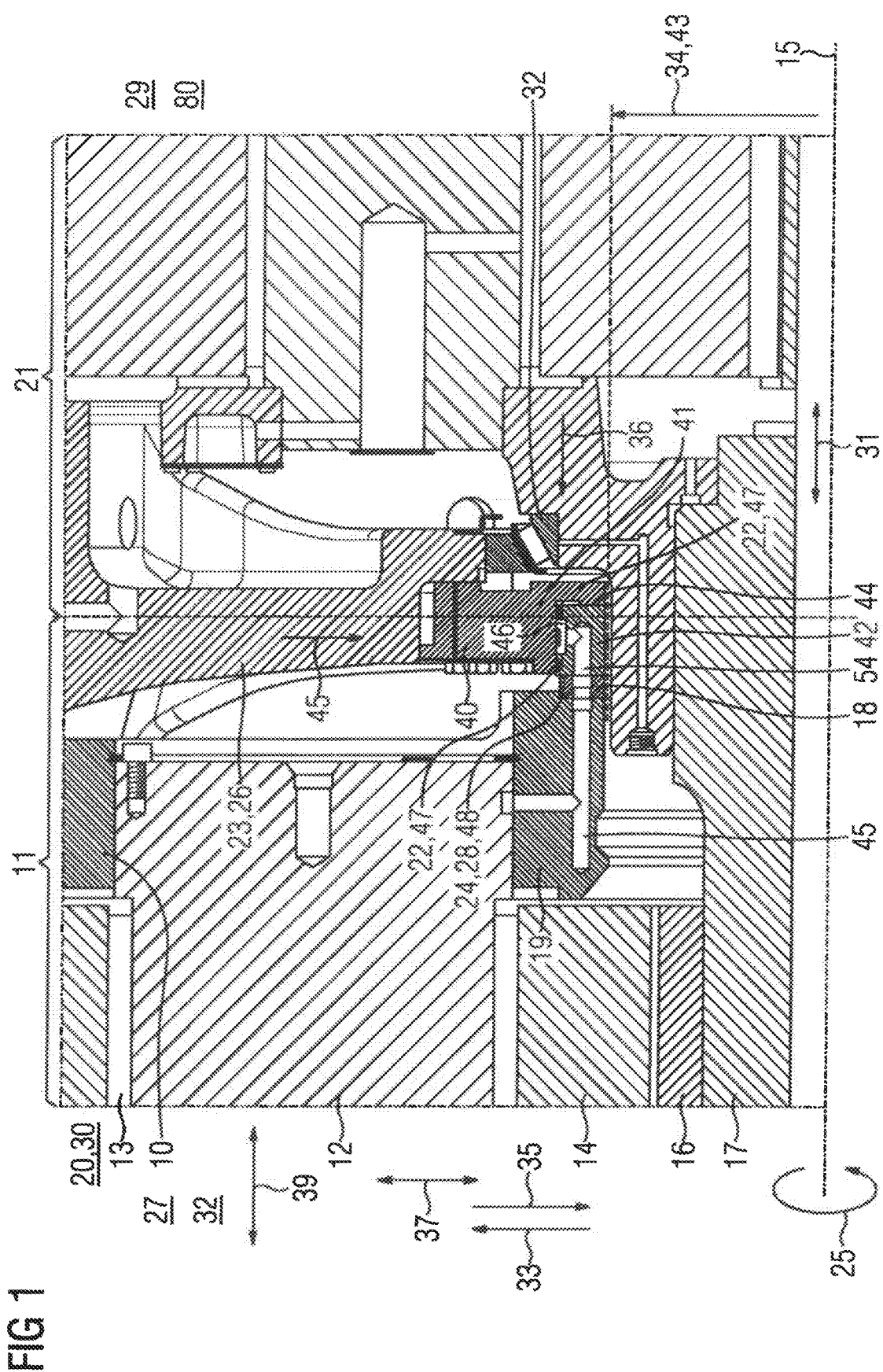
FIG. 1 diagrammatically shows a first embodiment of the claimed planetary carrier arrangement in a longitudinal section.

FIG. 1 diagrammatically shows the construction of a first embodiment of the claimed planetary carrier arrangement 30 which is arranged in a housing 23 of a planetary transmission 20. The planetary carrier arrangement 30 is arranged in a first planetary stage 11 which lies on a rotor side 27 of the planetary transmission 20. A second planetary stage 21 is positioned further in the direction of a generator side 29 of the planetary transmission 20, which second planetary stage 21 Interacts with the first planetary stage 11. The planetary carrier arrangement 30 comprises a planetary carrier 10 which can be rotated about a main rotational axis 15. A plurality of planetary gear pins 12, on which planetary gears 14 can rotate via plain bearings 13, are received in the planetary carrier 10. A torque 25 can be transmitted via a rotor shaft 62 (not shown in greater detail) to the planetary carrier 10, by way of which torque 25 a generator 64 (not shown in greater detail) can be driven via the planetary transmission 20. The planetary carrier arrangement 30 also comprises a lubricant dispensing unit 40 which is connected to a housing 23 of the planetary transmission 20. The lubricant dispensing unit 40 comprises a stator 41 which is connected to a wall 26 of the housing 23 and remains stationary during operation. A lubricant 45 which is to be conducted to the planetary carrier 10 is conveyed to the stator 41 through channels (not shown in greater detail) through the wall 26 of the housing 23.

The lubricant dispensing unit 40 also comprises an axially elastically movable thrust ring 42 which is arranged in a radially inner region of the stator 41. A radially Inner and radially outer direction relate in FIG. 1 to the main rotational axis 15 and are symbolized by the arrows 33 and 35. At least one spring element 44 is arranged between the axially elastically movable thrust ring 42 and the stator 41, by way of which spring element 44 a restoring force 36 is exerted on the axially elastically movable thrust ring 42. Sealing elements 22 which are arranged axially adjacently with respect to a feed groove 46 in the region of the stator 41 are arranged on a radial outer face 47 of the axially elastically movable thrust ring 41. During operation of the planetary carrier arrangement 30, lubricant 45 can be conducted out of the stator 41 into the feed groove 46. From there, the lubricant 45 can be conducted into the axially elastically movable thrust ring 42. By way of the latter, the lubricant 45 can in turn be conducted substantially in the axial direction 31 via at least one lubricant dispensing opening 54 into a sealing ring 18 and the planetary carrier 10.

As a result of the axially elastically movable thrust ring 42, it is pressed onto the sealing ring 18 which is arranged rotationally movably on the planetary carrier 10. The sealing ring 18 is produced from a sliding material, in particular a copper alloy, and forms a sliding sealing face 28 with an end face 24, which faces the stator 41, and an end face 48, facing away from the stator 41, of the axially elastically movable thrust ring 42. The sliding sealing face 28 is of circumferential configuration and permits the planetary carrier 10 to have a radial offset 37, without impairing the sealing action between the sealing ring 18 and the axially elastically movable thrust ring 42. By virtue of the fact that the thrust ring 42 is elastically movable in the axial direction 31, it is suitable to follow an axial offset 39 of the planetary carrier 10 during operation, and therefore to compensate for the axial offset 39. Accordingly, a reliable supply of lubricant to the plain bearings 13 is ensured even in the case of an Increased axial offset 39 of the planetary carrier 10. The planetary carrier 10 can be received in the housing 22 in a bearing-free manner at least on the side which faces the lubricant dispensing unit 40, in particular on the hub 19 there. In contrast, a bearing 32 of this type is provided in the second planetary stage 21, which bearing 32 can be dispensed with for the planetary carrier 10 of the claimed planetary carrier arrangement 30. The planetary carrier 10 has a clear internal diameter 34 of at least 130 mm. Correspondingly, the axially elastically movable thrust ring 42 has a clear internal diameter 43 of at least 150 mm. This allows the sun gear 16 and/or the sun shaft 17 which connects the first planetary stage 11 to the second planetary stage 21 to be configured with correspondingly Increased external diameters. The planetary carrier 10 is suitable to be aligned by forces and torques which prevail during operation and, as a result, to set a homogeneous load distribution to the planetary gears 14. As a result, at least three planetary gears 14 can be operated reliably in the planetary carrier 10. The planetary carrier arrangement 30 is modeled in a computer program product 80 which is configured to simulate the operating behavior of the planetary carrier arrangement 30.

Figure 2:
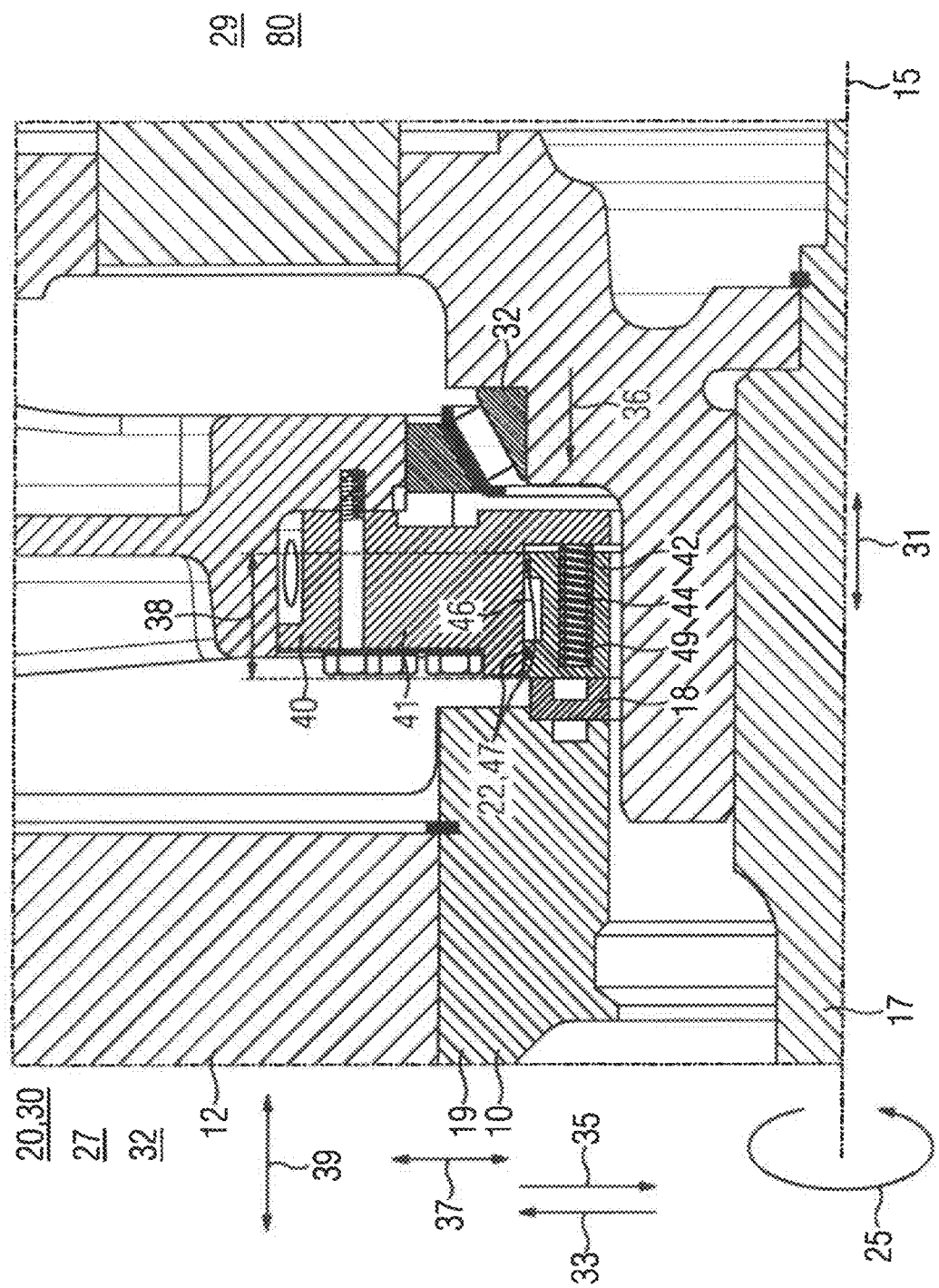
FIG. 2 shows the first embodiment in a further longitudinal section.

FIG. 2 shows the first embodiment of the claimed planetary carrier arrangement 30 In a different sectional plane in longitudinal section. At least one recess 49 is configured in the axially elastically movable thrust ring 42, in which recess 49 the at least one spring element 44 is received at least partially. The spring element 44 is configured as a helical spring which exerts a restoring force 36 on the axially elastically movable thrust ring 42, by way of which restoring force 36 the axially elastically movable thrust ring 42 is pressed against the sealing ring 18. Almost the entire axial width 38 of the axially elastically movable thrust ring 42 can be utilized for the recess 49. The deeper the configuration of the recess 49 in the axial direction 31, the more precisely the spring element 44 can be guided. The planetary gear arrangement 30 according to FIG. 2 therefore permits the use of enlarged spring elements 44 which are readily available as standardized components. As a consequence, the use of spring elements 44 which are compact and at the same time particularly rigid or resilient can be dispensed with.

Figure 3:
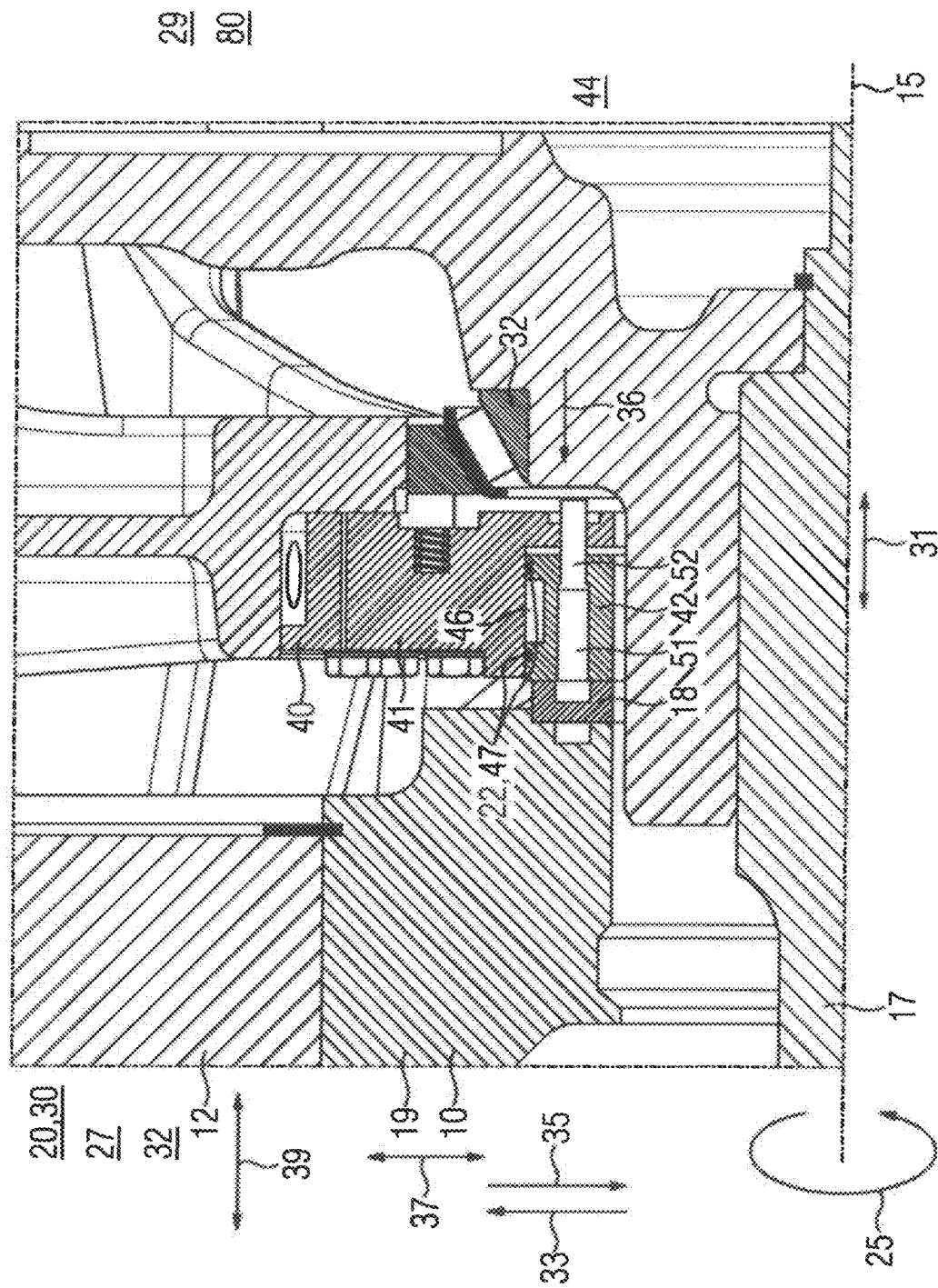
FIG. 3 shows the first embodiment in yet another longitudinal section, FIG. 4 diagrammatically shows an oblique view of one embodiment of an axially elastically movable thrust ring, and FIG. 5 diagrammatically shows the construction of one embodiment of the claimed wind power plant in a sectional oblique view.

FIG. 3 shows a further longitudinal section through the first embodiment of the claimed planetary carrier arrangement 30 according to FIG. 1 and FIG. 2. At least one holding opening 51 is configured in the elastically movable thrust ring 42, in which holding opening 51 a fastening means 52 Is received which is configured as a bolt. The fastening means 52 holds the axially elastically movable thrust ring 42 on the stator 41 and limits its axial movement in the direction of the restoring force 36 which is exerted by the at least one spring element 44. A rotation of the axially elastically movable thrust ring 42 in the circumferential direction is limited by way of the fastening means 52. Here, the circumferential direction is to be understood in relation to the main rotational axis 15. This ensures that it is always possible for lubricant 45 to pass into the planetary carrier 10. The embodiment according to FIG. 3 can be preassembled, with the result that a blind mounting operation is avoided during final assembly.

Figure 4:
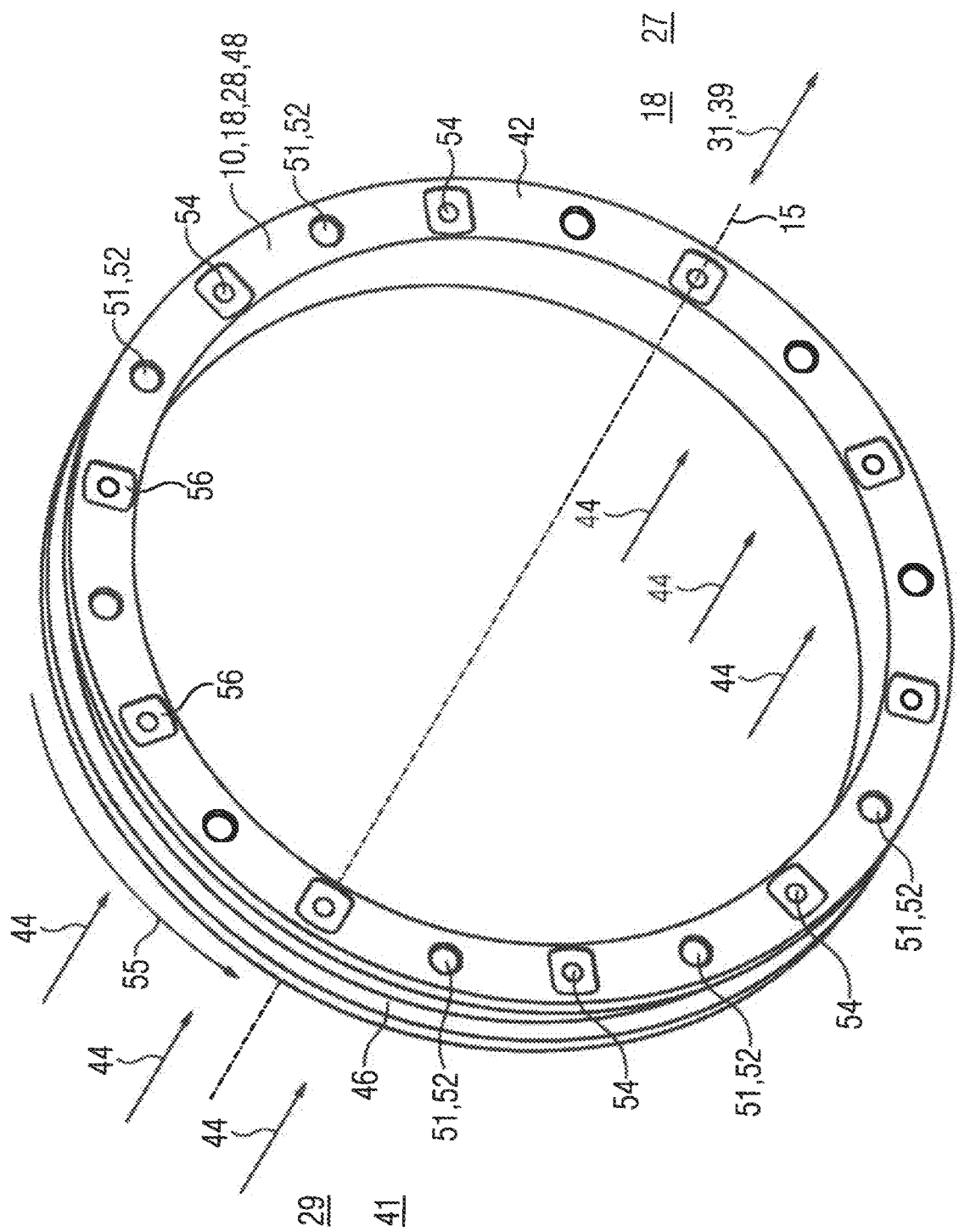

FIG. 4 shows an oblique view of one embodiment of an axially elastically movable thrust ring 42 which can be used in different embodiments of the claimed planetary carrier arrangement 30. A circumferential feed groove 46 is configured on the radial outside of the thrust ring 42, through which feed groove 46 lubricant 45 can be fed from a stator 41 (not shown in greater detail). The feed groove 46 is connected hydraulically to a plurality of lubricant dispensing openings 54 which open on an end face 48 in a rotor side 27 which, in the mounted state, lies opposite a sealing ring 18 or planetary carrier 19. The lubricant dispensing openings 54 are configured on the end face 48 spaced apart regularly in the circumferential direction 55. Furthermore, a lubricant pocket 56 which serves as a buffer during the transfer of the lubricant 45 is configured in each case in the region of the lubricant dispensing openings 54 on the end face 48. As a result, a homogeneous and reliable supply of lubricant to the planetary carrier 10 is ensured. A holding opening 51 Is configured in each case between the lubricant pockets 56, in which holding openings 51 a fastening means 52 can be received in each case. The thrust ring 42 is secured during operation against rotation along the circumferential direction 55 by way of the fastening means 52. Furthermore, spring elements 44 can be inserted on a side, lying opposite the end face 48, into the thrust ring 42 which is not shown in greater detail in FIG. 4. The insertion of the spring elements 44 from a generator side 29 is symbolized in FIG. 4 merely by way of arrows. As a result of the spring elements 44, the thrust ring 42 can be moved elastically along an axial direction 31 parallel to a main rotational axis 15 of the planetary carrier arrangement 30. This permits a compensation of an axial offset 39 of the planetary carrier 10, with which the thrust ring 42 interacts in the mounted state.

Figure 5:
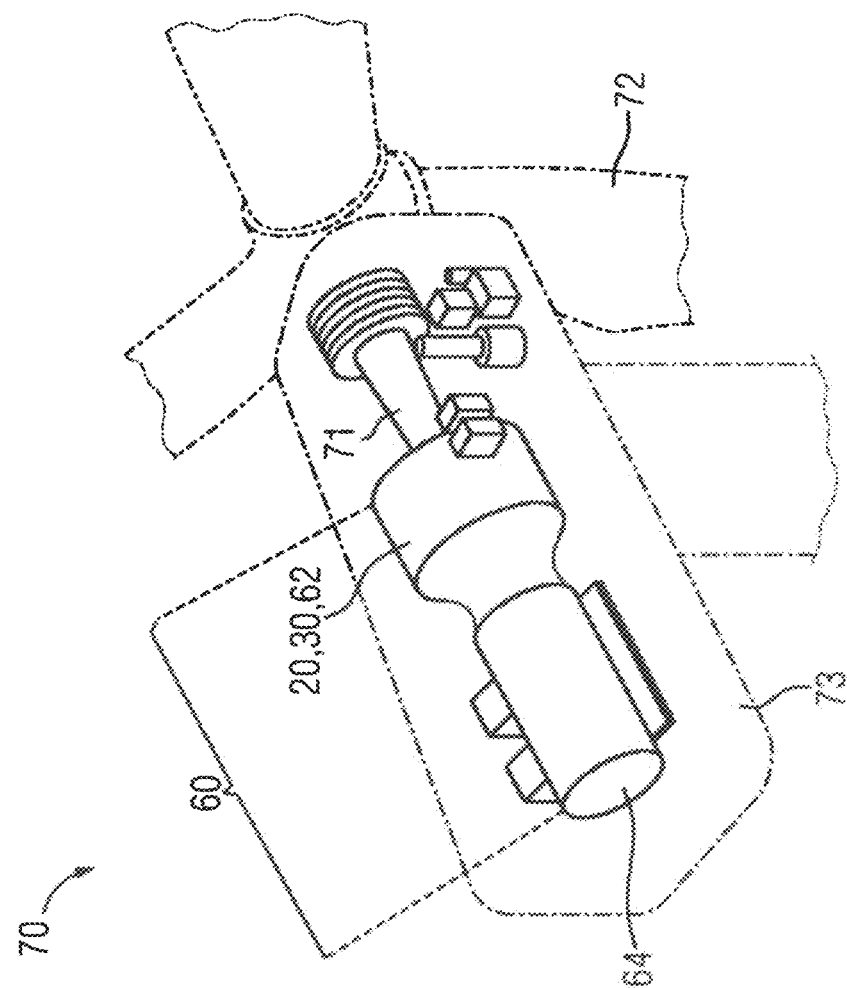

FIG. 5 shows one embodiment of a claimed wind power plant. The wind power plant 70 comprises a multiple blade rotor 72 which is attached rotatably to a nacelle 73. The multiple blade rotor 72 is connected to a rotor shaft 71 which is in turn connected in a torque-transmitting manner to a drive train 60. The drive train 60 has a transmission 62 which is coupled to a generator 64. The transmission 62 is configured as a planetary transmission 20 which has at least one planetary carrier arrangement 30. Here, the planetary carrier arrangement 30 is configured in accordance with one of the embodiments outlined above. Furthermore, the planetary carrier arrangement 30 is modeled in a computer program product 80, with the result that its operating behavior, in particular during operation of the wind power plant 70, can be simulated.

What is claimed is:

1. A planetary carrier arrangement, comprising:
   a planetary carrier; and
   a lubricant dispensing unit designed to dispense lubricant into the planetary carrier, said lubricant dispensing unit comprising an axially elastically movable thrust ring designed to compensate an axial offset of the planetary carrier, said thrust ring having a side in facing relationship to the planetary carrier, said side designed to include a lubricant pocket thereon.

2. The planetary carrier arrangement of claim 1, wherein the lubricant dispensing unit comprises a stator, and further comprising a spring element arranged between the thrust ring and the stator of the lubricant dispensing unit.

3. The planetary carrier arrangement of claim 2, wherein the spring element is designed as a member selected from the group consisting of helical spring, cup spring, annular spring, volute spring and elastomer body.

4. The planetary carrier arrangement of claim 1, further comprising a fastener designed to secure the thrust ring against rotation.

5. The planetary carrier arrangement of claim 2, further comprising a fastener designed to secure the thrust ring against rotation with respect to the stator.

6. The planetary carrier arrangement of claim 2, further comprising a sealing element arranged between a radial outer face of the thrust ring and the stator.

7. The planetary carrier arrangement of claim 1, further comprising a sealing ring attached to the planetary carrier and designed to receive lubricant from the thrust ring.

8. The planetary carrier arrangement of claim 1, further comprising a housing having sides, said planetary carrier being received in the housing in a bearing-free manner at least on one of the sides of the housing.

9. The planetary carrier arrangement of claim 1, wherein the planetary carrier comprises a hub, said thrust ring being arranged so as to lie opposite the hub of the planetary carrier.

10. The planetary carrier arrangement of claim 1, wherein the thrust ring has a clear interior diameter of at least 150 mm.

11. A computer program product embodied on a non-transitory computer readable medium comprising commands which, when executed by a computer, cause the computer to simulate an operating behavior of a planetary carrier arrangement as set forth in claim 1.

12. A planetary transmission, comprising:
    a planetary stage; and
    a planetary carrier arrangement arranged in the planetary stage and comprising a planetary carrier, and a lubricant dispensing unit designed to dispense lubricant into the planetary carrier, said lubricant dispensing unit comprising an axially elastically movable thrust ring designed to compensate an axial offset of the planetary carrier, said thrust ring having a side in facing relationship to the planetary carrier, said side designed to include a lubricant pocket thereon.

13. The planetary transmission of claim 12, further comprising at least three of said planetary stage.

14. The planetary transmission of claim 12, further comprising at least three planetary gears received rotatably in the planetary carrier of the planetary carrier arrangement.

15. A drive train for a wind power plant, said drive train comprising:
    a rotor shaft;
    a transmission connectable in a torque-transmitting manner to the rotor shaft, said transmission designed as set forth in claim 12; and
    a generator connected in a torque-transmitting manner to the transmission.

16. A wind power plant, comprising:
    a nacelle;
    a drive designed as set forth in claim 15; and
    a multiple blade rotor attached rotatably to the nacelle and connected in a torque-transmitting manner to the drive train.

* * * * *